United States Patent
Grilli et al.

(10) Patent No.: US 7,457,349 B2
(45) Date of Patent: *Nov. 25, 2008

(54) METHOD AND APPARATUS FOR MEASURING TIMING OF SIGNALS RECEIVED FROM MULTIPLE BASE STATIONS IN A CDMA COMMUNICATION SYSTEM

(75) Inventors: Francesco Grilli, Irvine, CA (US); Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 10/731,918

(22) Filed: Dec. 9, 2003

(65) Prior Publication Data

US 2004/0120386 A1 Jun. 24, 2004

Related U.S. Application Data

(62) Division of application No. 09/689,265, filed on Oct. 11, 2000, now Pat. No. 6,697,629.

(51) Int. Cl.
H04B 1/00 (2006.01)
(52) U.S. Cl. .................. 375/147; 375/136; 375/144; 375/148
(58) Field of Classification Search ......... 375/136–137, 375/142–145, 147–153
See application file for complete search history.

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,490,165 A | 2/1996 | Blakeney, II et al. |
| 5,508,708 A | 4/1996 | Ghosh et al. |
| 5,764,687 A | 6/1998 | Easton |
| 5,859,612 A | 1/1999 | Gilhousen |

(Continued)

FOREIGN PATENT DOCUMENTS

JP 11-088247 3/1999

(Continued)

OTHER PUBLICATIONS

Caffery et al., "Overview of Radiolocation in DCMA Cellular Systems," IEEE Communications Magazine, vol. 36, pp. 38-45, Apr. 1988.

(Continued)

*Primary Examiner*—Curtis B Odom
(74) *Attorney, Agent, or Firm*—Andrea L. Mays; Thomas R. Rouse

(57) ABSTRACT

Unassigned finger processors are used to process and measure the arrival times of transmissions from base stations not in the active set. A first set of one or more base stations in active communication with the remote terminal is identified and each base station in the first set is assigned at least one finger processor. A second set of one or more base stations not in active communication with the remote terminal is also identified and an available finger processor is assigned to each of at least one base station in the second set. A (signal arrival) time measurement is then performed for each base station, and outputs indicative of the measurements are provided for further processing.

31 Claims, 7 Drawing Sheets

U.S. PATENT DOCUMENTS

| | | | |
|---|---|---|---|
| 5,945,948 A | 8/1999 | Amitava et al. | |
| 5,970,413 A | 10/1999 | Gilhousen | |
| 6,011,974 A | 1/2000 | Cedervall et al. | |
| 6,078,611 A * | 6/2000 | La Rosa et al. | 375/147 |
| 6,081,229 A | 6/2000 | Soliman et al. | |
| 6,181,944 B1 | 1/2001 | Uebayashi et al. | |
| 6,205,331 B1 | 3/2001 | Jeon | |
| 6,263,208 B1 | 7/2001 | Chang et al. | |
| 6,275,483 B1 * | 8/2001 | Papasakellariou et al. | 370/335 |
| 6,353,412 B1 | 3/2002 | Soliman | |
| 6,539,006 B1 * | 3/2003 | Taylor | 370/335 |
| 6,574,211 B2 | 6/2003 | Padovani et al. | |
| 6,697,629 B1 * | 2/2004 | Grilli et al. | 455/456.1 |
| 2001/0043578 A1 * | 11/2001 | Kumar et al. | 370/331 |

FOREIGN PATENT DOCUMENTS

| | | |
|---|---|---|
| JP | 11-261440 | 9/1999 |
| JP | 11-261528 | 9/1999 |
| JP | 2000-269932 | 9/2000 |
| WO | 98010306 | 3/1998 |
| WO | 00035208 | 6/2000 |

OTHER PUBLICATIONS

Hepsaydir, "Analysis of Mobile Positioning Measurements, in CDMA Cellular Networks," Radio and Wireless Conference 1999, pp. 73-76, Aug. 1999.

Reed et al., "An Overview of the Challenges and Progress in Meeting the E-911 Requirement for Location services."<IEEE Communications Magazine, vol. 36, No. 4, pp. 30-37, Apr. 1998.

* cited by examiner

METHOD AND APPARATUS FOR MEASURING TIMING OF SIGNALS RECEIVED FROM MULTIPLE BASE STATIONS IN A CDMA COMMUNICATION SYSTEM

CLAIM OF PRIORITY UNDER 35 U.S.C. §120

The present application is a divisional of U.S. patent application Ser. No. 09/689,265, filed Oct. 11, 2000, now U.S. Pat. No. 6,697,629 now allowed and assigned to the assignee hereof and hereby expressly incorporated by reference herein

BACKGROUND OF THE INVENTION

I. Field of the Invention

The present invention relates to data communication. More particularly, the present invention relates to a novel and improved method and apparatus for measuring timing of signals received from multiple base stations in a CDMA communication system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." A specific CDMA system is disclosed in U.S. Pat. No. 6,574,211, entitled "METHOD AND APPARATUS FOR HIGH RATE PACKET DATA TRANSMISSION," issued Jun. 3, 2003. These patents are assigned to the assignee of the present invention and incorporated herein by reference.

A CDMA system is typically designed to conform to one or more standards. Such standards include the "TIA/EIA/IS-95 Remote terminal-Base Station Compatibility Standard for Dual-Mode Wideband Spread Spectrum Cellular System" (the IS-95 standard), the standard offered by a consortium named "3rd Generation Partnership Project" (3GPP) and embodied in a set of documents including Document Nos. 3G TS 25.211, 25.212, 25.213, 25.214, 25.133, 25.305, 25.331 and 3G TR 25.926 (the W-CDMA standard), and the "TR-45.5 Physical Layer Standard for cdma2000 Spread Spectrum Systems" (the cdma2000 standard). New CDMA standards are continually proposed and adopted for use. These CDMA standards are incorporated herein by reference.

A CDMA system can be operated to support voice and data communication. During a particular communication (e.g., a voice call), a remote terminal may be in active communication with one or more base stations, which are typically placed in an "active set" of the remote terminal. The remote terminal may also receive signals from one or more other base stations for other types of transmission such as, for example, pilot, paging, broadcast, and so on.

The CDMA system can be designed with the capability to determine the position of a remote terminal. In fact, the Federal Communications Commission (FCC) has mandated support for an enhanced emergency 911 (E-911) service whereby the location of a remote terminal in a 911 call is required to be sent to a Public Safety Answering Point (PSAP). For position determination, the arrival times of the transmissions from a number of base stations are measured at the remote terminal. The differences between the signal arrival times can then be computed and translated into pseudo-ranges, which are then used to determine the position of the remote terminal.

Various challenges are encountered in measuring the signal arrival times. For example, in a wireless communication system, the mobility of the remote terminal may affect the accuracy of the arrival time measurements, if these measurements are not made close in time. Also, the arrival times are typically measured based on the internal timing of the remote terminal, which may be continually adjusted to track the timing of one of the base stations with which the remote terminal is in communication. The remote terminal's movement and the variation (and uncertainty) in its time reference can impact the accuracy of the arrival time measurements, which may in turn translate to a less accurate estimate of the position of the remote terminal.

Accordingly, techniques that can be used to improve the accuracy of the arrival time measurements, which may lead to improved accuracy in the estimated position of the remote terminal, are highly desirable.

SUMMARY OF THE INVENTION

The invention provides various techniques to more accurately measure the arrival times of transmissions received at a remote terminal from a number of base stations. In accordance with one aspect of the invention, unassigned finger processors are used to process and measure the arrival times of transmissions from base stations not in the remote terminal's active set. In accordance with another aspect of the invention, if no finger processors are available for assignment to base stations not in the active set, the arrival times can be measured in the time period between updates of a reference clock used for the measurements. This can reduce the adverse effect due to slewing of the reference clock as it is adjusted to track the timing of one of the base stations. To reduce the adverse effect due to movement of a mobile remote terminal, the arrival times can be measured within as short a time window as possible.

An aspect of the invention provides a method for determining a position of a remote terminal in a communication system. In accordance with the method, a first set of one or more base stations in active communication with the remote terminal is identified and each base station in the first set is assigned at least one finger processor of a rake receiver. A second set of one or more base stations not in active communication with the remote terminal is also identified and an available finger processor is assigned to each of at least one base station in the second set. A (signal arrival) time measurement (e.g., an SFN-SFN measurement, as defined by W-CDMA standard, or a Pilot Phase measurement, as defined in IS-801) is then performed for each base station assigned with at least one finger processor. Outputs indicative of the time measurements obtained for the assigned base stations are then provided (e.g., to the system) for further processing. Since the finger processors operate in parallel, the measurement can be performed at approximately the same instance in time. This greatly improves the usability of the measurements for position location techniques.

To determine the position of the remote terminal, the arrival times for the earliest arriving multipaths for three or four base stations and/or satellites can be measured.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
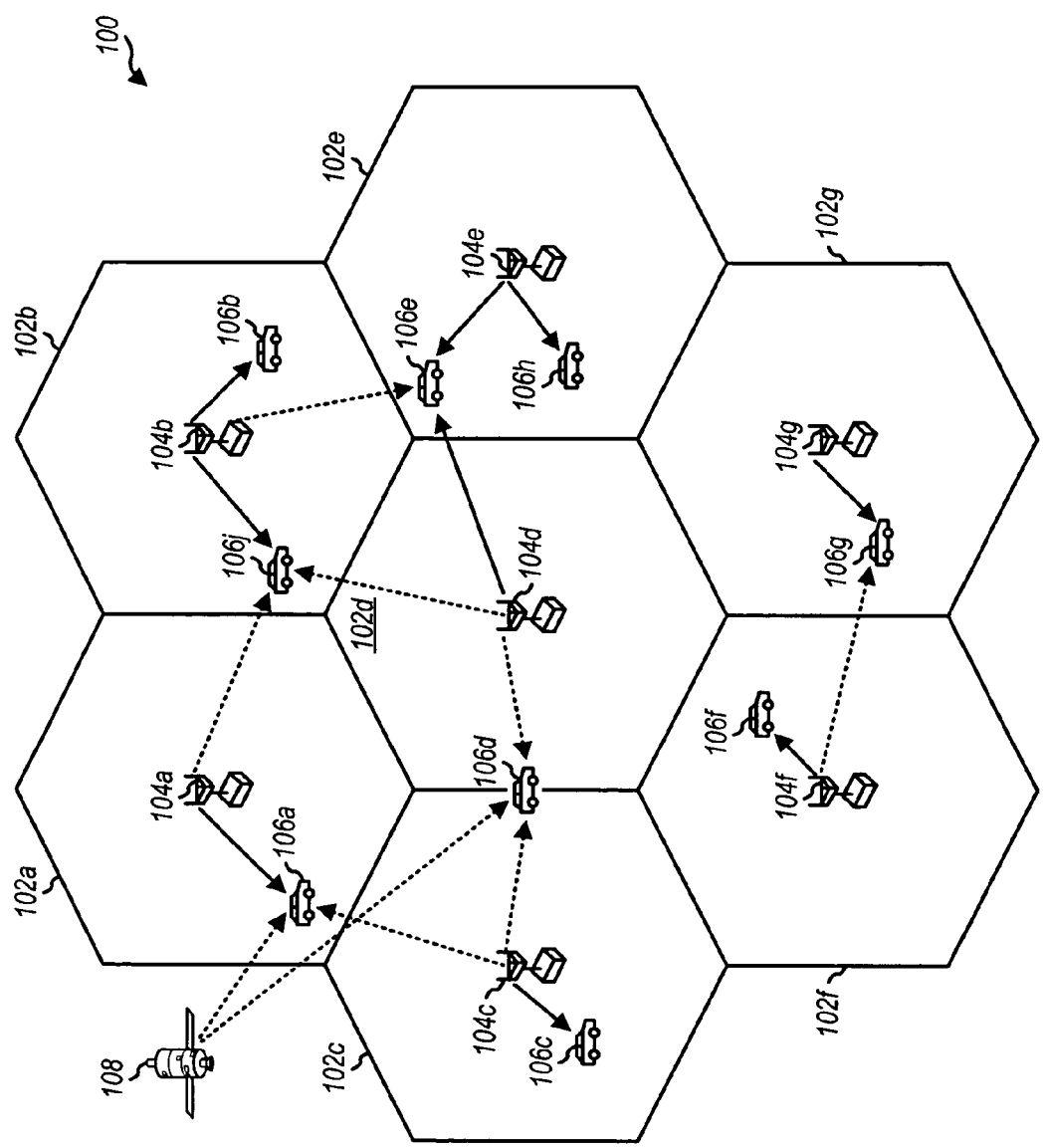
FIG. 1 is a simplified block diagram of a communication system in which the invention may be implemented.

FIG. 1 is a diagram of a communication system 100 that supports a number of users. System 100 provides communication for a number of cells 102a through 102g, with each cell 102 being serviced by a corresponding base station 104. Various remote terminals 106 are dispersed throughout the system. In an embodiment, each remote terminal 106 may communicate with one or more base stations 104 on the downlink and uplink at any given moment, depending on whether the remote terminal is in soft handoff. The downlink (forward link) refers to transmission from the base station to the remote terminal, and the uplink (reverse link) refers to transmission from the remote terminal to the base station. System 100 may be designed to conform to one or more CDMA standards, such as the IS-95, W-CDMA, cdma2000, and other standards, or a combination thereof.

As shown in FIG. 1, base station 104a transmits to remote terminals 106a and 106j on the downlink, base station 104b transmits to remote terminals 106b, 106e, and 106j, base station 104c transmits to remote terminals 106a, 106c, and 106d, and so on. In FIG. 1, the solid line with the arrow indicates a user-specific data transmission from the base station to the remote terminal. A broken line with the arrow indicates that the remote terminal is receiving pilot and other signaling, but no user-specific data transmission, from the base station. The uplink communication is not shown in FIG. 1 for simplicity.

For certain applications, such as position determination, remote terminal 106 may also receive transmissions from one or more Global Positioning System (GPS) satellites 108. The satellite transmissions can be used to supplement the base station measurements to determine the position of the remote terminal, as described in further detail below.

Figure 2:
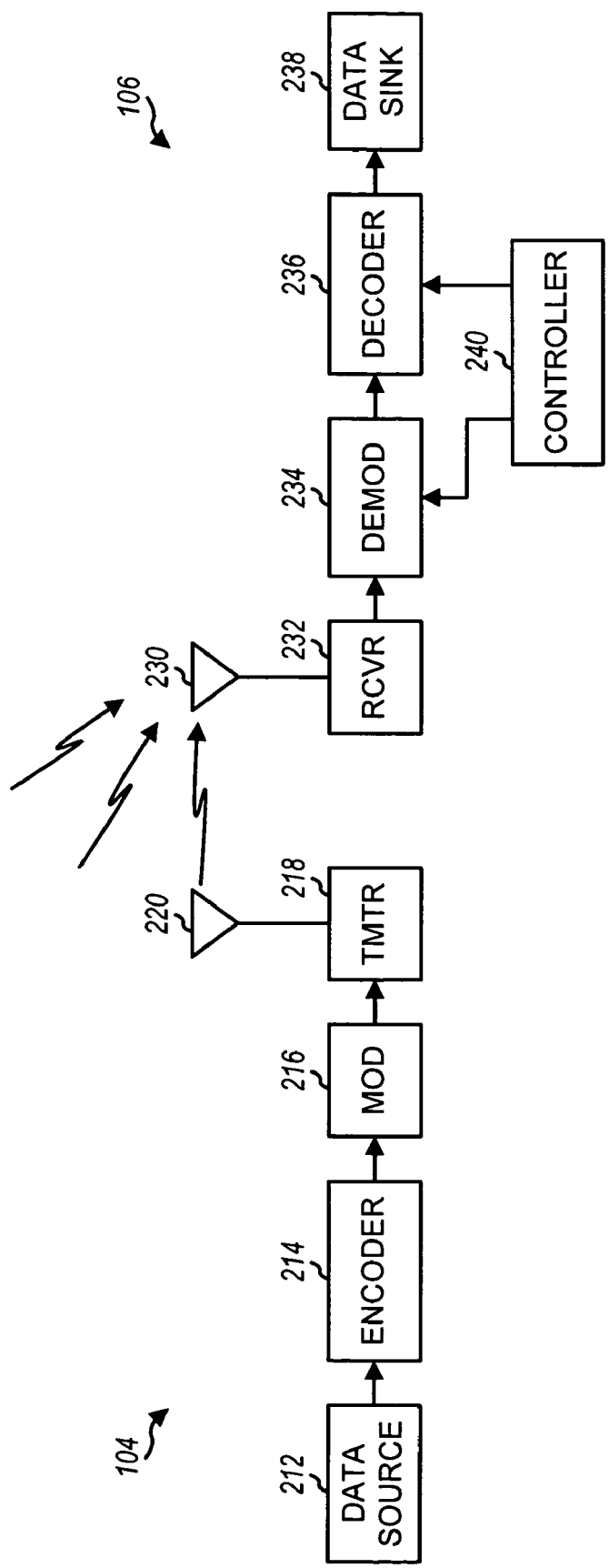
FIG. 2 is a simplified block diagram of an embodiment of the signal processing for a downlink transmission.

FIG. 2 is a simplified block diagram of an embodiment of the signal processing for a downlink transmission. At base station 104, data is sent, typically in packets, from a data source 212 to an encoder 214. Encoder 214 performs a number of functions, depending on the particular CDMA system or standard being implemented. Such functions typically include formatting each data packet with the necessary control fields, cyclic redundancy check (CRC) bits, and code tail bits. Encoder 214 then encodes one or more formatted packets with a particular coding scheme and interleaves (i.e., reorders) the symbols within the encoded packets. Encoder 214 also may perform rate matching of the packet (e.g., by repeating or puncturing bits).

The interleaved packet is provided to a modulator (MOD) 216 and may be scrambled with a scrambling sequence (for IS-95 CDMA system), covered with a channelization code, and spread with spreading codes (e.g., short PNI and PNQ codes). The spreading with the spreading codes is referred to as "scrambing" by the W-CDMA standard. The channelization code can be an orthogonal variable spreading factor (OVSF) code (for W-CDMA system), a Walsh code (for IS-95 CDMA system), or some other orthogonal code, again depending on the particular CDMA system or standard being implemented. The spread data is then provided to a transmitter (TMTR) 218 and quadrature modulated, filtered, and amplified to generate one or more modulated signals. The modulated signal(s) are transmitted over-the-air from one or more antennas 220. The downlink processing is described in further detail in the applicable CDMA standards.

At the receiver unit, the modulated signals from one or more base stations 104 are received by an antenna 230 and routed to a receiver (RCVR) 232. Receiver 232 filters, amplifies, quadrature demodulates, and digitizes the received signal. The digitized samples are then provided to a demodulator (DEMOD) 234 and despreaded (or descrambled) with despreading codes, (possibly) descrambled with a descrambling code (for the IS-95 CDMA system), and decovered with a channelization code for each physical channel being processed. The despreading, descrambling, and channelization codes correspond to the codes used at the transmitter unit. The demodulated data is then provided to a decoder 236 that performs the inverse of the functions performed at encoder 214 (e.g., the de-interleaving, decoding, and CRC check functions). The decoded data is provided to a data sink 238. A controller 240 can direct the operation of demodulator 234 and decoder 236.

The block diagram, as described above, supports transmissions of packet data, messaging, voice, video, and other types of communication on the downlink. A bi-directional communication system also supports uplink transmission from the remote station to the base station. However, the uplink processing is not shown in FIG. 2 for simplicity.

Referring back to FIG. 1, each remote terminal 106 may receive user-specific and/or general transmissions from one or more base stations 104 on the downlink. For example, remote terminal 106e concurrently receives user-specific (i.e., dedicated) transmissions from base stations 104d and 104e. Each remote terminal 106 typically maintains a list of the base stations with which it is in active communication. This list is typically referred to as the remote terminal's active set. Each remote terminal 106 may also receive other general (i.e., non-user dedicated) transmissions (e.g., pilot, paging, broadcast, and so on) from other base stations with which the remote terminal may or may not be in active communication. These other base stations may be placed in a second list maintained by the remote terminal. For simplicity, the base stations in the active set are herein referred to as the "active" base stations, and the base stations in the second list are referred to as the "inactive" base stations.

Figure 3:
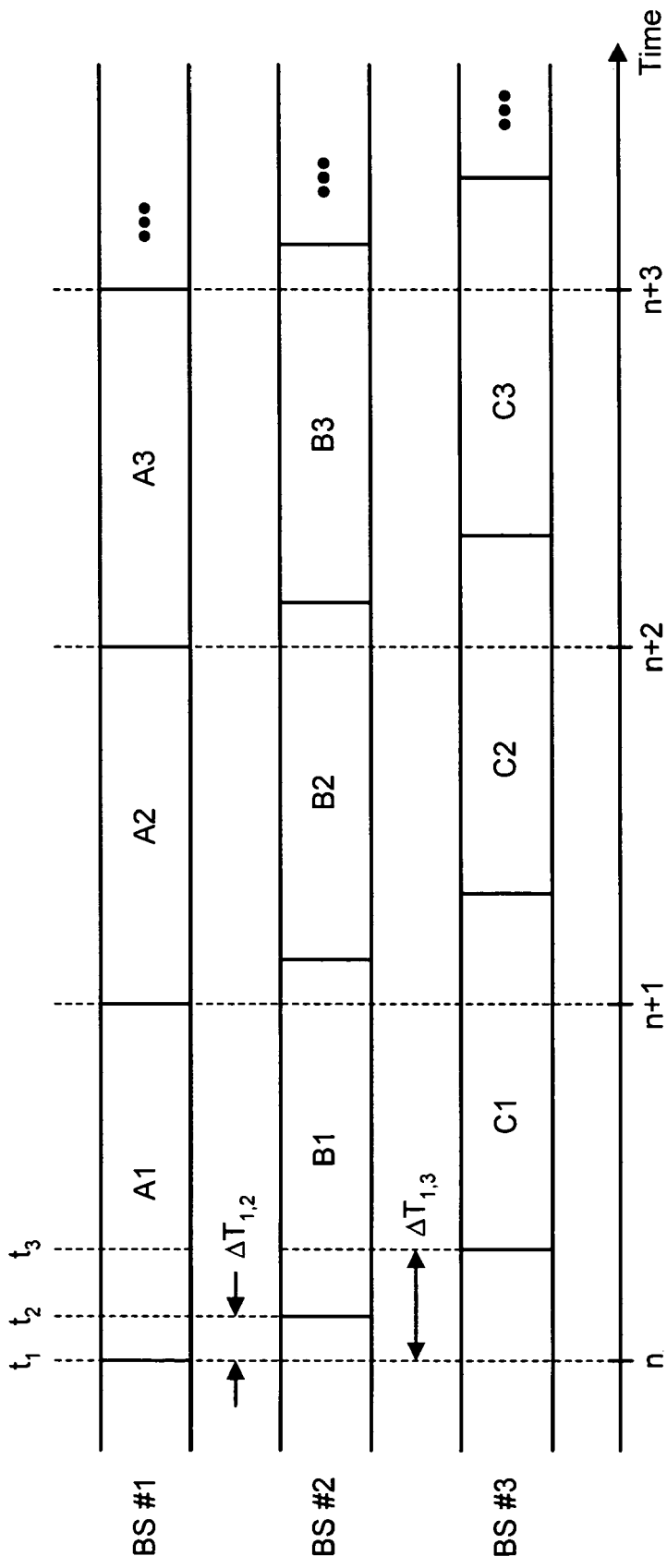
FIG. 3 is a diagram that illustrates the transmissions received at a remote terminal from a number of base stations.

FIG. 3 is a diagram that illustrates the transmissions received at a remote terminal from a number of base stations (three in this example). For some CDMA systems (e.g., the W-CDMA system), the transmissions from multiple base stations may not be synchronous. For these CDMA systems, radio frames can be transmitted starting at different times for different base stations. Moreover, the propagation time of the transmission can be different for each base station, depending on the distance between the base station and the remote terminal. Thus, the transmissions from different base stations are typically received by the remote terminal at different times.

For some applications, it is useful or necessary to know the arrival times of the transmissions from multiple base stations. The signal arrival times, as measured at the remote terminal, can then be used to compute time differences or time offsets, $\Delta T$, between the transmissions received from various base stations. If the base stations transmit asynchronously (as for the W-CDMA system) and since the propagation times are variable, the time offsets $\Delta T$ can take on any (random) values.

As shown in FIG. 3, the radio frames (B1, B2, ...) received from base station 2 are offset in time by $\Delta T1,2$ from the radio frames (A1, A2, ...) received from base station 1. Similarly, the radio frames (C1, C2, ...) received from base station 3 are offset by $\Delta T1,3$ from the radio frames received from base station 1. The time offsets $\Delta T1,2$ and $\Delta T1,3$ are not defined by a particular relationship.

The time offsets $\Delta T$ can be used for various applications. For example, in the W-CDMA system, an SFN-SFN (system frame number) measurement (equivalent to the time offset $\Delta T$ in FIG. 3) can be made by the remote terminal and sent to the system so that the transmission from a new base station can be compensated as part of a hand-over process. The compensation approximately aligns the time at which radio frames from different base stations are received by the mobile station (or User Equipment, UE). The time offset between the new and current base stations during the hand-over is specific to the remote terminal. Typically, a coarse SFN-SFN measurement (e.g., one chip or worse resolution) is adequate for this application.

In another application, the time offsets are used to determine the position of the remote terminal. In a trilateration technique, the arrival times for transmissions from a number of base stations are measured at the remote terminal. The time offsets are then computed and used to derive the distances to the base stations, which are in turn used to determine the position of the remote terminal. For this application, accurate arrival time measurements are needed, and greater accuracy in the measurements translates to a more accurate estimate of the remote terminal's position. For example, at a chip rate of 1.2288 Mcps, 1 chip of temporal resolution equates to a spatial resolution of approximately 244 meters. Location estimation accuracy is a function of the "spatial resolution" of the measurements and of the geometry (position with respect to the mobile station) of the base stations. For a given geometry, a better spatial resolution yields better location estimation accuracy. Sub-chip resolution (e.g., half chip, quarter, eighth, sixteenth, and so on) allows for more accurate position estimates. For example, sixteenth chip resolution at a chip rate of 1.2288 Mcps equates to a spatial resolution of approximately 15 meters. And in the W-CDMA system, the chip rate is 3.84 Mcps, which can provide improved spatial resolution.

As noted above, various challenges are encountered in making accurate arrival time measurements. First, for a remote terminal that is moving, the signal arrival times for all base stations of interest should be measured close in time (e.g., concurrently) so that adverse effects due to the remote terminal's movement are reduced or minimized. If the arrival times for transmissions from the base stations are measured at different times, the measurements would include errors corresponding to the amount of movement by the remote terminal. For example, for a remote terminal traveling at 120 km/hr, measurements taken 200 msec apart would be subject to an error of approximately 12 meters, the distance the remote terminal has moved during the 200 msec time period.

Second, the arrival times should be measured such that updates of the remote terminal's time reference minimally impact the accuracy of the measurements. The remote terminal typically includes a reference oscillator that is operated to track the timing of the most "significant" base station. Depending on the particular system implementation, the most significant base station may represent the earliest arriving base station or the strongest base station. For a mobile remote terminal, the base station designated as the most significant base station typically changes as the remote terminal moves about the system. The reference oscillator may thus be adjusted (i.e., slewed) from the time reference of the current significant base station to that of a new significant base station in an attempt to track the timing of the new base station. If the signal arrival times for the base stations are measured at two or more different points in time and if the reference oscillator is slewed during this time period, the accuracy of the measurements may be compromised since they are effectively made with different time references.

The movement of the remote terminal and the slewing of the reference oscillator can adversely affect the accuracy of the arrival time measurements. To reduce the adverse impact, the signal arrival times for all base stations of interest should be measured as close in time as possible. If this is achieved, the measurements for all base stations are similarly affected approximately cancel out.

A remote terminal in a CDMA system typically employs a rake receiver to process one or more transmissions on the downlink. The rake receiver typically includes a searcher element and a number of finger processors. The searcher element searches for strong instances of the received signal (i.e., multipaths). The finger processors are then assigned to process the strongest multipaths to generate demodulated symbols for those multipaths. The demodulated symbols from all assigned finger processors can then be combined to generate recovered symbols that are improved estimates of the transmitted data. The rake receiver can be used to efficiently combine energy received via multiple signal paths from one or more base stations. A specific design of the rake receiver is described below.

The available finger processors of the rake receiver can be assigned to process multipaths from one or more base stations. The finger processors are typically only assigned to process multipaths from base stations in the remote terminal's active set. In certain operating modes (e.g., sleep mode), the rake receiver may be operated to process paging or other transmissions from a base station for a short period of time to determine whether there is a communication for it (and then falls back to sleep). The finger processors are thus conventionally used to process transmissions and not to measure timing.

In many instances, not all available finger processors are assigned to process multipaths from the base stations in the active set during a communication session. For example, ten finger processors may be available and only six may be assigned to process the multipaths from two active base stations. In this case, four finger processors may be available for other use. It is typically not desirable to assign finger processors to poor quality multipaths since the noise from these multipaths may degrade rather than improve the overall estimates.

In accordance with an aspect of the invention, unassigned finger processors are used to process and measure the arrival times of transmissions from base stations not in the active set. As noted above, a number of finger processors are typically available to process a number of multipaths. Some of the available finger processors are assigned to process one or more multipaths for each base station in the active set. Unassigned finger processors can then be assigned to process the multipaths for base stations not in the active set.

To determine the position of the remote terminal, the finger processors can be assigned to process at least one multipath from three or four base stations and/or satellites. For improved accuracy, the assigned finger processors are operated such that the signal arrival times for all base stations are measured at approximately the same time. By making the measurements approximately concurrently, adverse effects associated with the remote terminal's movement and the reference oscillator's slewing are ameliorated.

The searcher element can be operated to (continually) search for multipaths for active and inactive base stations. This can be achieved by performing a correlation of the digitized samples with various PN offsets and computing the signal quality for each PN offset. An available finger processor can then be assigned to a discovered multipath, of sufficient strength, for each of a number of base stations, as many as necessary for the particular application. For example, for position determination, multipaths for three or four base stations or satellites are processed.

Depending on the particular application being implemented, the finger processors may be assigned to different types of multipath. For position determination, the finger processors can be assigned to the earliest arriving multipaths that exceed a particular signal quality. For a direct line of sight transmission, the earliest arriving multipath is also the strongest multipath. However, due to reflections in the transmission path, the multipaths may add constructively or destructively at the remote terminal depending on the amount of delays experienced by the multipaths. Thus, the earliest multipath may not necessarily be the strongest multipath. For position determination, the earliest multipath is typically processed since it more likely to be indicative of a line-of-sight transmission (and distance).

A rake receiver can be designed with the capability to process the received signal with a time resolution of less than a chip. For example, some rake receivers are designed with eighth (⅛th) chip resolution or finer. This may be achieved by digitizing and processing the received signal at eight times the chip rate. The increased resolution can translate to a more precise position determination. To further improve the precision of the position determination, interpolation can be used to generate interpolated samples having a particular time offset from the digitized samples. The interpolated samples can then be processed in similar manner as for digitized samples.

In one embodiment, the available finger processors are assigned to base stations not in the active set only for the time duration needed to measure the signal arrival times (e.g., to perform the SFN-SFN measurements). In another embodiment, the finger processors are assigned to the non-active base stations on a longer-term basis (e.g., until the finger processors are needed for another active base station). This longer-term assignment allows the finger processors to track the timing of the transmissions from the base stations being processed (e.g., to track the pilot), which can result in improved accuracy for the arrival time measurements.

Rake receivers are typically designed to combine the demodulated symbols from all assigned finger processors. However, since the finger processors may be assigned to base stations not in the active set and used only to make signal arrival time measurements, the rake receiver of the invention is designed and operated such that symbols from inactive base stations are not combined with those from active base stations.

Various types of transmission from the base stations can be processed to measure the signal arrival times. For example, the data transmission on a traffic channel, the pilot on a pilot channel, the messages on the paging and broadcast channels, and so on, can be processed to determine the signal arrival times. For some CDMA system (e.g., the W-CDMA system), the transmissions for various types of channel may not be synchronous. In an embodiment, a particular type of channel (e.g., the broadcast channel) from all base stations can be selected for processing. In another embodiment, the finger processors are assigned to process different types of channels for different base stations. The identities of the channels processed by the remote terminal can be provided to the system, which can then determine the time offset between the different channel types and appropriately compensate the measured arrival times.

In a specific embodiment that is especially applicable for the W-CDMA system, the signal arrival times are measured based on the broadcast channel. The W-CDMA standard defines a (logical) broadcast control channel that is mapped to a (transport) broadcast channel (BCH) that is further mapped to a (physical) primary common control channel (P-CCPCH). The broadcast control channel is a higher layer channel that is used to broadcast messages to the remote terminals. The broadcast messages are transmitted in (10 msec) radio frames on the P-CCPCH. The P-CCPCH can be processed in a manner known in the art to determine the start of the radio frames, which can be used to represent the signal arrival times for the base stations. The time offsets between the base stations can then be computed as the difference between the start of the radio frames from these base stations. The broadcast channel in the W-CDMA system is described in further detail in the aforementioned 3G TS, 25.133, 25.305, and 25.331 documents.

Besides the broadcast channel, other transmissions and channels can also be processed to determine the signal arrival times. For example, the pilot reference can be processed and the signal arrival times can be determined based on the PN offset. User-specific data transmission (on an assigned traffic channel) may also be processed to determine the signal arrival times.

Referring back to FIG. 3, the earliest multipath for a particular channel (e.g., the broadcast channel) from the first base station can be processed and the start of the radio frame for this channel can be determined to occur at t1. Similarly, the earliest multipath for the second and third base stations can be similarly processed and the start of the radio frames for these base stations can also be determined to occur at t2 and t3, respectively. Although not shown in FIG. 3, the earliest multipath for a fourth base station can also be processed and the start of the radio frame can be determined for this base station. One or more of the base stations may not be in the remote terminal's active set, but are assigned finger processors, if available, for the arrival time measurements. The processing for all base stations can be achieved approximately concurrently.

Based on the measured signal arrival times for the base stations, the time offsets can then be determined. One of the base stations (e.g., the one with the earliest arriving multipath) can be selected as the reference base station. The time offsets for other base stations can then be computed relative to this reference base station. For the example shown in FIG. 3, the time offset between the first and second base stations can be computed as ($\Delta T1,2=t1-t2$), and the time offset between the first and third base stations can be computed as ($\Delta T1,3=t1-t3$).

The determination of the position of the remote terminal based on the arrival times for the earliest arriving multipaths for three or four base stations and/or satellites can be achieved in accordance with the techniques described in the 3GPP 25.305, TIA/EIA/IS-801, and TLA/EIA/IS-817 standard documents and in U.S. Pat. No. 6,353,412, entitled "METHOD AND APPARATUS FOR DETERMINING POSITION LOCATION USING REDUCED NUMBER OF GPS SATELLITES AND SYNCHRONIZED AND UNSYNCHRONIZED BASE STATIONS," issued Mar. 5, 2002. These documents and applications are incorporated herein by reference. The position determination can be performed by the Position Determination Entity (PDE) or the SMLC. The PDE or SMLC can be located in the MSC, in the Radio Network Controller (RNC), or can be independent.

Figure 4:
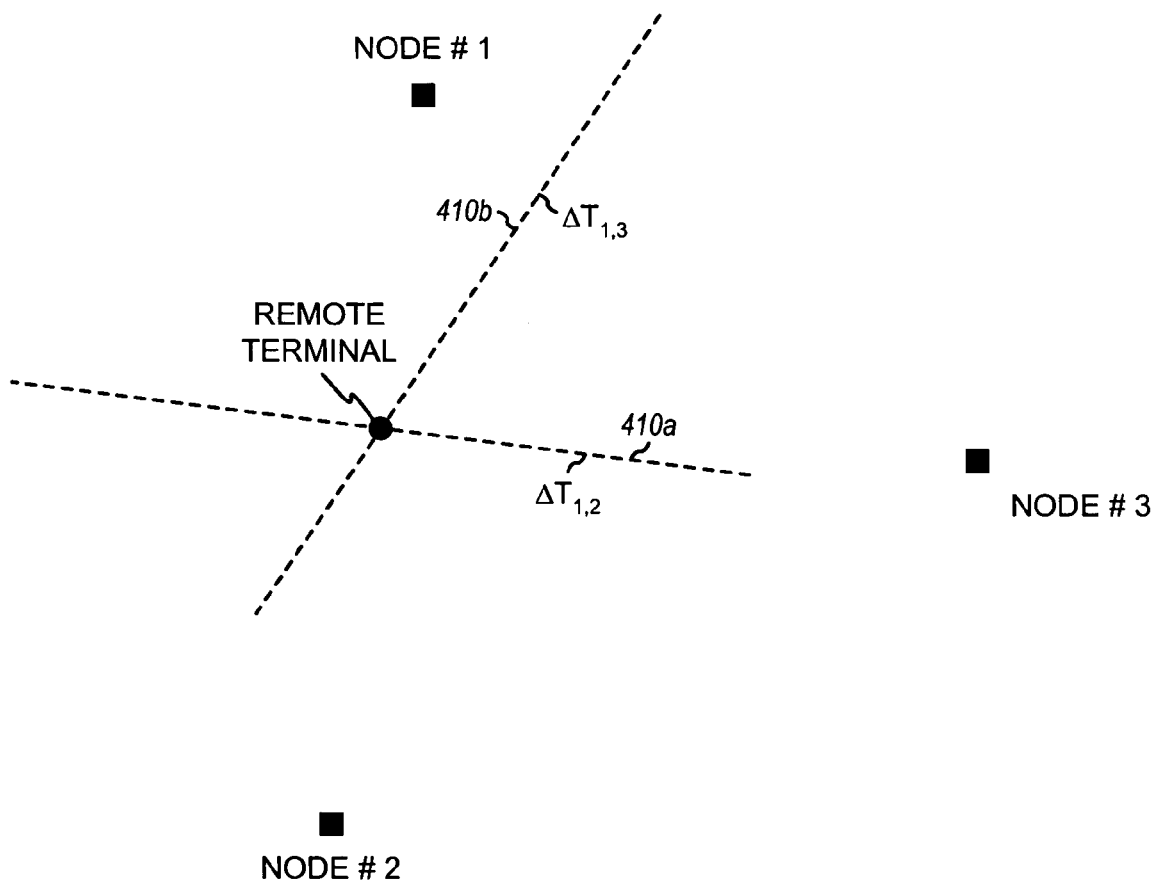
FIG. 4 is a diagram that illustrates the estimation of the remote terminal's position based on computed time offsets between transmissions from the base stations and/or satellites.

FIG. 4 is a diagram that illustrates the determination of the remote terminal's position based on the computed time offsets. In an embodiment, the SFN-SFN measurements indicative of the time offsets can be provided to a mobile switching center (MSC) and further processed to determine the position of the remote terminal. The MSC has knowledge of the actual timing and locations of the base stations. The MSC can then determine the actual (true) time offsets $\Delta TA1,2$ and $\Delta TA1,3$ by subtracting the actual transmit times for these base stations from the measured time offsets $\Delta T1,2$ and $\Delta T1,3$. The MSC can next determine parabolas 410*a* and 410*b* for the actual time offsets $\Delta TA1,2$ and $\Delta TA1,3$, respectively. The remote terminal's position can be identified as the intersection of the two parabolas.

In another embodiment, the remote terminal receives the actual timing and locations of the base stations and estimates its position based on this information and the computed time offsets $\Delta T1,2$ and $\Delta T1,3$. The remote terminal can then transmit its position to one or more base stations.

The determination of the position of the remote terminal based on signal arrival time measurements is described in further detail in U.S. Pat. No. 6,081,229 entitled "SYSTEM AND METHOD FOR DETERMINING THE POSITION OF A WIRELESS CDMA TRANSCEIVER," issued Jun. 27, 2000, U.S. Pat. No. 5,970,413, entitled "USING A FREQUENCY THAT IS UNAVAILABLE FOR CARRYING TELEPHONE VOICE INFORMATION TRAFFIC FOR DETERMINING THE POSITION OF A MOBILE SUBSCRIBER IN A CDMA CELLULAR TELEPHONE SYSTEM," issued Oct. 19, 1999, and U.S. Pat. No. 5,859,612 entitled "METHOD FOR USING AN ANTENNA With A ROTATING BEAM FOR DETERMINING THE POSITION OF A MOBILE SUBSCRIBER IN A CDMA CELLULAR TELEPHONE SYSTEM," issued Jan. 12, 1999. The patents are assigned to the assignee of the present invention and incorporated herein by reference.

Figure 5:
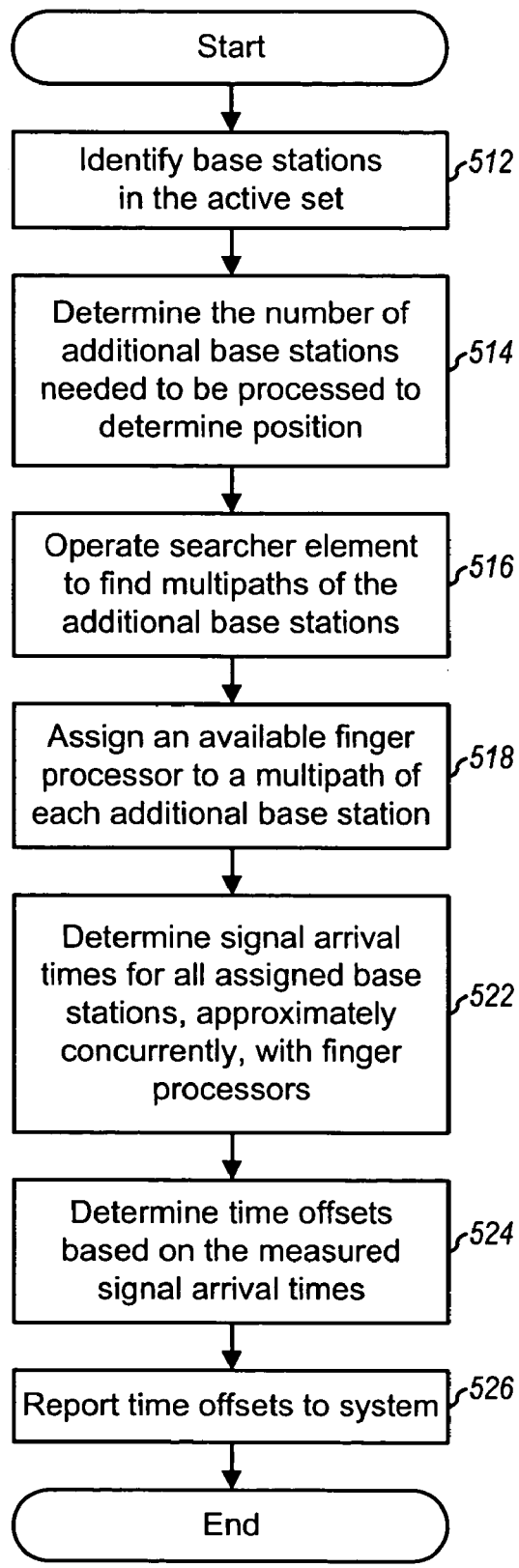
FIG. 5 is a flow diagram of an embodiment of the processing to determine the position of a remote terminal, wherein finger processors are assigned to base stations not in the active set.

FIG. 5 is a flow diagram of an embodiment of the processing to determine the position of a remote terminal, wherein one or more finger processors are assigned to one or more base stations not in the active set. Initially, the base stations in the active set of the remote terminal are identified, at step 512.

The number of additional base stations needed to be processed to determine the position of the remote terminal is then determined, at step 514. Thereafter, the searcher element is operated to find multipaths of the additional base stations, at step 516, and an available finger processor is assigned to the (earliest arriving) multipath of each additional base station, at step 518.

The finger processors are then operated to determine the arrival times of the transmissions from all assigned base stations (i.e., base stations assigned with one or more finger processors), at step 522. The arrival times can be measured at approximately the same time to minimize the adverse impacts from movement by the remote terminal and slewing of the reference oscillator. The time offsets between pairs of base stations are then determined based on the measured arrival times, at step 524, and reported to the system, at step 526. The system can then determine the position of the remote terminal based on the reported time offsets.

The multipaths for the base stations are processed by the remote terminal based on a clock signal generated by a reference oscillator, which can be a voltage controlled crystal oscillator (VCXO) or some other clock source. The reference oscillator is typically operated to track the timing of one of the multipaths being processed. For example, the reference oscillator may be operated to track the timing of the earliest arriving multipath, the strongest multipath, or is some other multipath. As the remote terminal moves about the communication system, or is in communication with multiple base stations, or is hand off from one significant base station to another, the reference oscillator may be adjusted to track the timing of a new base station. The reference oscillator may thus be slewed from one time reference to another.

The received signal is processed based on the clock signal from the reference oscillator, and the arrival time measurements are thus affected by adjustments to the reference oscillator. If the signal arrival times for all base stations are measured at approximately the same point in time, the measurements are similarly affected by the clock signal. However, in certain instances, finger processors are not available for assignment to all base stations needed to determine the position of the remote terminal. In this case, the signal arrival times cannot be measured concurrently and some of the measurements need to be performed sequentially. In accordance with another aspect of the invention, if no finger processors are available for assignment to base stations not in the active set, the signal arrival times for these base stations are measured at the remote terminal in the time period between updates of the reference oscillator. This can reduce the adverse effect due to slewing of the reference oscillator on the accuracy of the arrival time measurements. To reduce the adverse effect due to the remote terminal's movement, the signal arrival times can be measured within as short a time window as possible.

The reference oscillator at the remote terminal is typically updated at a particular update rate (e.g., once every 200 msec for a specific design). At each update instance, a particular control value is provided to the reference oscillator to move it toward the timing of the significant base station. The reference oscillator then moves from its current state toward a final state based on a particular (e.g., RC) response characteristic. At the next update instance, another control value may be provided, and the reference oscillator moves in a similar manner once more.

If the signal arrival times are measured such that some of the measurements are made before the update of the reference oscillator and other measurements are made after the update, the slewing of the reference oscillator can adversely affect the accuracy of the measurements. To reduce the effects of slewing, the signal arrival times for all base stations of interest are measured between updates of the reference oscillator. The signal arrival times can also be measured a particular time period, tDELAY, after an update to allow the reference oscillator some time to settle toward its final value. The delay period tDELAY can be selected based on the particular design of the reference oscillator and may be selected such that the reference oscillator has reached a particular value (e.g., 90 percent of the final value). After the delay period tDELAY passes, the signal arrival times can be measured in various manners.

In one embodiment, the searcher element is employed to measure the signal arrival times for the base stations not in the active set. Initially, the searcher element processes the received signal and searches for strong multipaths. This can be achieved by searching for pilots in the received signal at various PN offsets. A list of potential pilots for the inactive base stations can then be compiled. This list includes identified pilots that exceed a particular signal quality.

To measure the signal arrival times, the searcher element can synchronize to each pilot in the list. Since the PN offset of the pilot was previously determined, the searcher element can synchronize to the pilot in a shorter time period, which may be dictated in part by the amount of movement in the pilot since it was last processed. For each synchronized pilot, the searcher element measures the signal arrival time. At approximately the same time, the assigned finger processors are also operated to measure the signal arrival times for other base stations (in the active set). Again, the signal arrival times for all base stations of interest can be measured within as short a time period as possible to minimize the effects of movement (if any) by the remote terminal. The measured arrival times from the searcher element and the finger processors are subsequently processed in the manner described above.

The measurements of the signal arrival times by the searcher element can be scheduled. In the time period between updates of the reference oscillator, the signal arrival times for a number of base stations can be measured sequentially. For example, the pilots from these base stations can be processed in a particular order determined to provide good results.

The list of potential pilots can be traversed such that pilots from different base stations are processed sequentially. In one implementation, the earliest arriving pilot for each base station is processed in sequential order. For example, the earliest arriving pilot for a first base station is processed first, the earliest arriving pilot for a second base station is processed next, and so on. In another implementation, the pilot with the best signal quality for each base station is processed in sequential order. For example, the (best signal quality) pilot for the first base station is processed first, the (best signal quality) pilot for the second base station is processed next, and so on. Different processing orders can also be contemplated and are within the scope of the invention.

The signal arrival times can be measured by the searcher element based on the pilots, as described above. Alternatively, the signal arrival times can be measured by processing the radio frames. In another embodiment, one or more previously assigned finger processors are (temporarily) employed to measure signal arrival times for base stations not in the active set. Finger processors assigned to the lowest signal quality multipaths for the active base stations can be selected for reassignment. The finger processors can be reassigned for the time period needed to measure the signal arrival times and can thereafter be returned back to the active base stations. The reassigned finger processors can be operated to measure the signal arrival times for the inactive base stations in similar manner as that described above.

Figure 6:
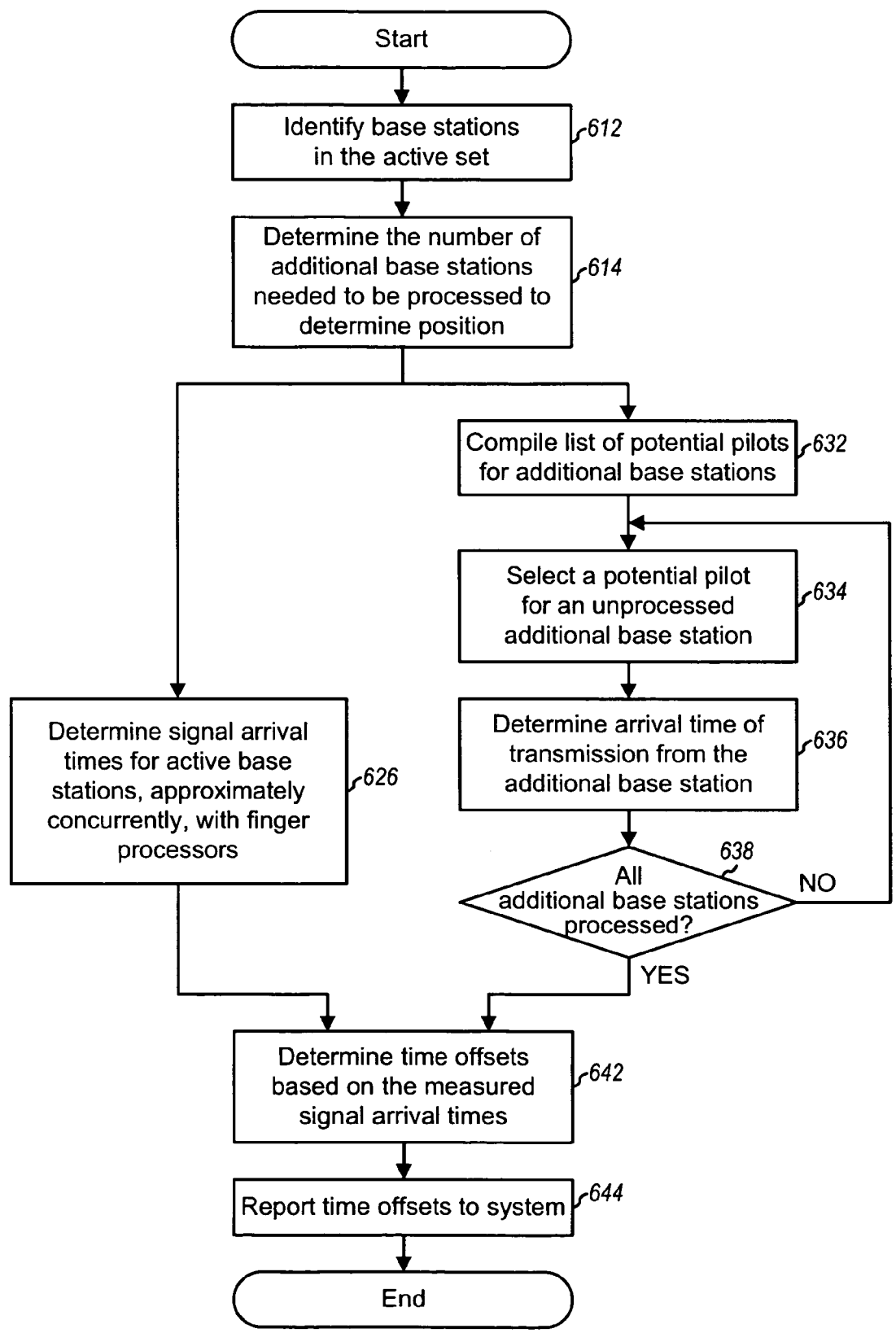
FIG. 6 is a flow diagram of an embodiment of the processing to determine the position of a remote terminal, wherein finger processors are not available for assignment to base stations not in the active set.

FIG. 6 is a flow diagram of an embodiment of the processing to determine the position of a remote terminal, wherein finger processors are not available for assignment to base stations not in the active set. Initially, the base stations in the active set of the remote terminal are identified, at step 612. The number of additional base stations needed to be processed to determine the position of the remote terminal is then determined, at step 614. Thereafter, the signal arrival times are determined for the base stations via two processing paths.

In one processing path, a list of potential pilots for the additional base stations is compiled, at step 632. A pilot for an unprocessed additional base station is then selected from the list, at step 634. The selected pilot can be the earliest multipath for the additional base station. The arrival time of the transmission from this additional base station is determined (e.g., using a searcher element or a reassigned finger processor), at step 636. A determination is then made whether all additional base stations have been processed, at step 638. If the answer is no, the process returns to step 634 and another pilot for another additional base station is selected for processing. Otherwise, the process continues to step 642.

In the other processing path, the signal arrival times for base stations assigned with one or more finger processors are determined, at step 626. The signal arrival times for the active base stations can be measured approximately concurrently, and can also be made at or near the time the signal arrival times are being measured for the additional base stations. The process then continues to step 642.

The time offsets between pairs of base stations are then determined based on the measured signal arrival times, at step 642, and reported to the system, at step 644. The system can then determine the position of the remote terminal based on the time offsets.

In accordance with yet another aspect of the invention, the position of the remote terminal is determined using a hybrid scheme whereby signal arrival times are measured for one or more base stations and one or more GPS satellites, with the measurements being made close in time and/or using available (unassigned) finger processors. The signal arrival time measurements for GPS satellites typically require clear line-of-sight to the satellites. Thus, the use of GPS is generally limited to outdoors use where obstructions are not present, and is typically not available for in-building applications and where there are obstructions such as foliage or buildings. However, GPS has extensive coverage and four or more GPS satellites can (potentially) be received from virtually anywhere. In contrast, base stations are typically located in populated areas but their signals are able to penetrate some buildings and other obstructions. Thus, base stations can be advantageously used to determine position within cities and (potentially) within buildings. The position determination can be achieved in accordance with the techniques described in the aforementioned 3GPP 25.305, TIA/EIA/IS-801, and TIA/EIA/IS-817 standard documents and U.S. Pat. No. 6,353,412.

In accordance with the hybrid scheme, each base station and each GPS satellite represents a transmission node. To determine the position of the remote terminal, transmissions from three or more (non-spatially aligned) nodes (base stations and/or satellites) are processed. The fourth node can be used to provide altitude and can also provide increased accuracy (i.e., reduced uncertainty in the measured arrival times). The signal arrival times can be determined for the transmission nodes and used to compute pseudo-ranges, which can then be used (e.g., via a trilateration technique) to determine the position of the remote terminal. If the measurements are performed at or near the same time, the adverse effects due to slewing and mobility described above may be reduced.

The ability to quickly and accurately determine the position of the remote terminal can be advantageously used for various applications. In one application, the position of the remote terminal can be automatically reported to the system in some situations (e.g., in an emergency, during a 911 call). In another application, the position of the remote terminal can be ascertained (e.g., to retrieve a lost remote terminal). Upon receiving a request to locate the remote terminal, a message can be sent to command the remote terminal to perform the necessary measurements. In yet another application, the position of the remote terminal can be used to provide more relevant information. For example, if a user is lost, the position of the remote terminal can be ascertained and used to provide directions from that position. As another example, if a user desires to search for an Italian restaurant, the location of the remote terminal can be determined and used to find the closest Italian restaurants. This feature can also be used to locate, for example, the closest gas stations, restaurants, supermarkets, lodging, and so on.

Figure 7:
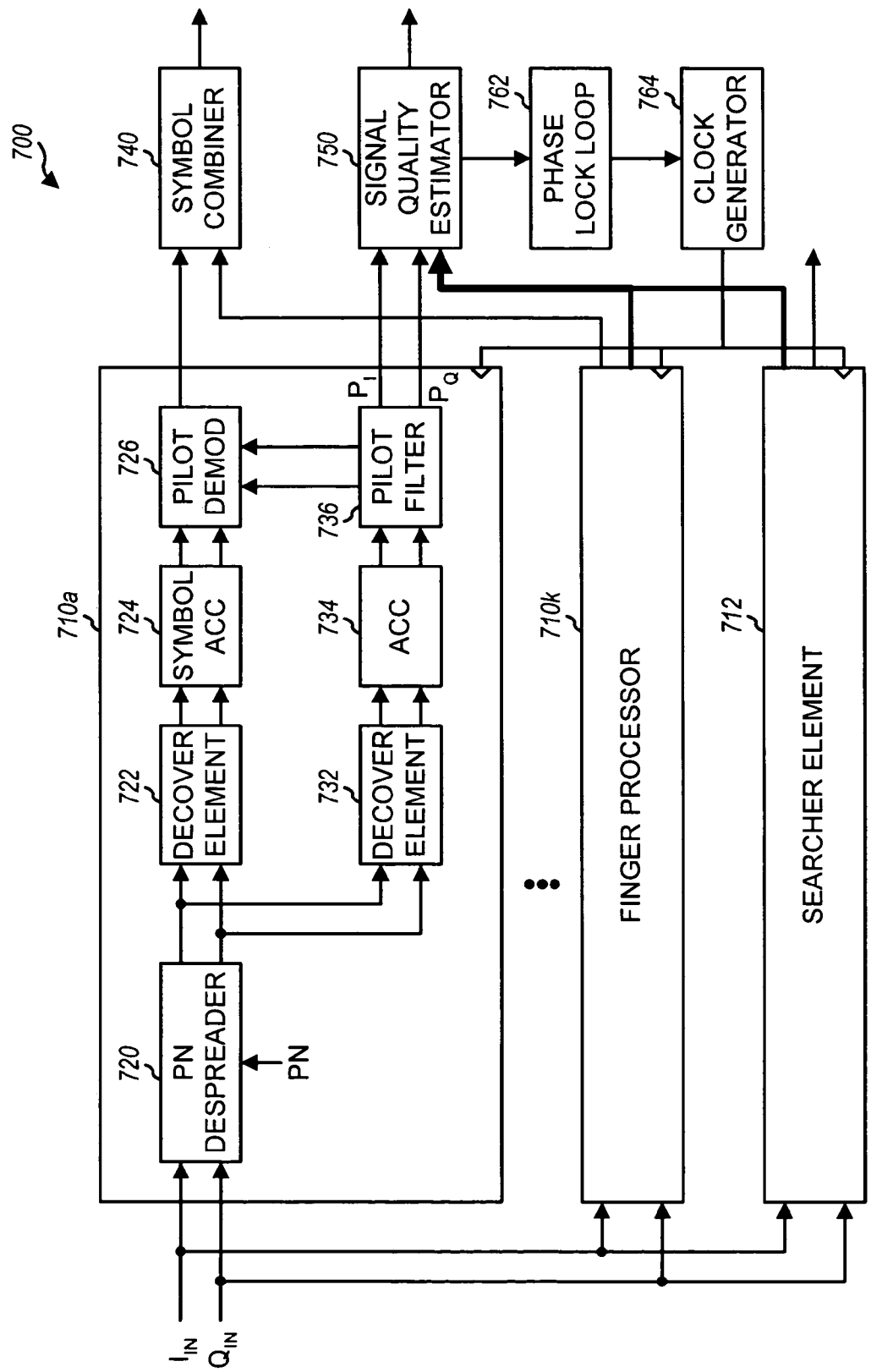
FIG. 7 is a block diagram of an embodiment of a rake receiver that can be used to implement various aspects of the invention.

FIG. 7 is a block diagram of an embodiment of a rake receiver 700, which can be used to receive and demodulate transmissions from a number of base stations. Rake receiver 700 can be used to implement demodulator 234 in FIG. 2. One or more RF modulated signals from one or more base stations are processed and digitized by receiver 232 to generate (IIN) and quadrature (QIN) samples and that are then provided to rake receiver 700. In a typical implementation, the received signal is sampled at a sample rate, fS, that is higher than the chip rate, fC, of the received signal. For example, the chip rate may be fC=1.2288 Mcps for an IS-95 CDMA system (or 3.84 Mcps for a W-CDMA system) but the sample rate may be, for example, 8 times (i.e., 8×chip), 16 times (i.e., 16×chip), 32 times (i.e., 32×chip), or some other multiple times the chip rate. The higher sample rate allows for fine adjustment of the timing to "zoom in" on a multipath.

As shown in FIG. 7, the digitized IIN and QIN samples from receiver 232 are provided to a number of finger processors 710a through 710k. Within each assigned finger processor 710, the IIN and QIN samples are provided to a PN despreader 720, which also receives a (complex) PN sequence. The complex PN sequence is generated in accordance with the particular design of the CDMA system being implemented and, for some CDMA systems, is generated by multiplying the short IPN and QPN sequences with the long PN sequence. In the IS-95 CDMA system, the short PN sequence is used to spread the data at the transmitting base station, and the long PN sequence is assigned to the recipient remote terminal and used to scramble the data. The complex PN sequence is generated with a time offset corresponding to the particular multipath being processed by that finger processor.

PN despreader 720 performs a complex multiply of the complex IIN and QIN samples with the complex PN sequence and provides complex despread IDES and QDES samples to decover elements 722 and 732. Decover element 722 decovers the despread samples with one or more channelization codes (e.g., Walsh or OVSF codes) that were used to cover the data and generates complex decovered samples. The decovered samples are then provided to a symbol accumulator 724 that accumulates the samples over the length of the channelization codes to generate decovered symbols. The decovered symbols are then provided to a pilot demodulator 726.

For the downlink, a pilot reference is typically transmitted along with other data transmission. Depending on the particular CDMA standard implemented, the pilot reference may be transmitted using time division multiplexing (TDM) or code division multiplexing (CDM). In either case, the pilot is typically channelized with a particular channelization code. Thus, decover element 732 decovers the despread samples with the particular channelization code (e.g., a Walsh code 0 for the IS-95 CDMA system) that was used to cover the pilot reference at the base station. The decovered pilot samples are then provided to an accumulator 734 and accumulated over a particular time interval to generate pilot symbols. The accumulation time interval can be the duration of the pilot channelization code, an entire pilot reference period, or some other time interval. The pilot symbols are then provided to a pilot filter 736 and used to generate pilot estimates that are provided to pilot demodulator 726. The pilot estimates are estimated or predicted pilot symbols for the time period when data is present.

Pilot demodulator 726 performs coherent demodulation of the decovered symbols from symbol accumulator 724 with the pilot estimates from pilot filter 736 and provides demodulated symbols to a symbol combiner 740. Coherent demodulation can be achieved by performing a dot product and a cross product of the decovered symbols with the pilot estimates in a manner known in the art. Symbol combiner 740 receives and coherently combines the demodulated symbols from finger processors 710 assigned to active base stations to provide recovered symbols, which are then provided to the subsequent processing element.

Searcher element 712 can be designed to include a PN despreader and a PN generator. The PN generator generates the complex PN sequence at various time offsets, possibly as directed by controller 240, in the search for the strongest multipaths. For each time offset to be search, the PN despreader receives and despreads the IIN and QIN samples with the complex PN sequence at the particular time offset to provide despread samples. A signal quality estimator 750 then estimates the quality of the despread samples. This can be achieved by computing the energy of each despread sample (i.e., IDES2+QDES2) and accumulating the energy over a particular time period (e.g., the pilot reference period). Searcher element performs the search at numerous time offsets, and the multipaths having the highest signal quality measurements are selected. The available finger processors 710 can then be assigned to process these multipaths.

The design and operation of a rake receiver for an CDMA system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," and U.S. Pat. No. 5,490,165, entitled "DEMODULATION ELEMENT ASSIGNMENT IN A SYSTEM CAPABLE OF RECEIVING MULTIPLE SIGNALS," both assigned to the assignee of the present invention and incorporated herein by reference.

FIG. 7 shows a specific design of a rake receiver. Other rake receiver structures and implementations can also be used and are within the scope of the invention. For example, in another rake receiver design, the samples are stored to a buffer and segments of samples at different time offsets are later retrieved and processed. In this design, the number of finger processors that can be implemented is limited by the processing speed of the rake receiver. Other rake receiver designs can also be contemplated and are within the scope of the invention.

FIG. 7 also shows the circuitry used to generate the clock signal for the elements of rake receiver 700. A phase lock loop (PLL) 762 receives the pilot estimates for the significant base station, determines the phase of the received pilot, and generates a control signal. The control signal can be updated at a particular update rate (e.g., once every 200 msec or some other time period). A clock generator 764 includes reference oscillator that receives the control signal from PLL 762 and adjusts its frequency accordingly to track the phase of the pilot. Clock generator 764 then generates a clock signal based on the reference oscillator and provides the clock signal to various elements within rake receiver 700.

The processing units described herein (e.g., the rake receiver, decoder, controller, and others) can be implemented in various manners. For example, each of these processing units can be implemented in an application specific integrated circuit (ASIC), a digital signal processor, a microcontroller, a microprocessor, or other electronic circuits designed to perform the functions described herein. The processing units can also be integrated into one or more integrated circuits. Also, the processing units can be implemented with a general-purpose or specially designed processor operated to execute instruction codes that achieve the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A remote terminal in a communication system, comprising:
   a first receiver operative to receive, process, and digitize a received signal to provide samples;
   a rake receiver coupled to the first receiver and operative to receive and process the samples to provide time measurements indicative of times of arrival of transmissions received at the remote terminal from a plurality of base stations; and
   a reference oscillator configured to generate a clock signal used by the rake receiver,
   wherein the rake receiver includes a plurality of finger processors, wherein a first set of one or more finger processors is assigned to a first set of one or more base stations in active communication with the remote terminal,
   wherein a second set of one or more finger processors is assigned to a second set of one or more base stations not in active communication with the remote tenniiial,
   wherein finger processors assigned to base stations in the first and second sets are operative to perform the time measurements on the transmissions received from the base stations, and
   wherein the finger processors perform the time measurements within a time period between updates of the reference oscillator.

2. The remote terminal of claim 1, wherein the time measurements are performed at approximately the same instance in time.

3. The remote terminal of claim 1, wherein the time measurement for each base station is based on an earliest arriving multipath received for the base station.

4. The remote terminal of claim 1, wherein the time measurements for the base stations are based on transmissions on a particular channel.

5. A remote terminal in a communication system, comprising:
   a first receiver operative to receive, process, and digitize a modulated signal to provide samples; and
   a rake receiver coupled to the first receiver and operative to receive and process the samples to provide time measurements indicative of times of arrival of transmissions received at the remote terminal from a plurality of base stations, wherein the rake receiver includes:
   a plurality of finger processors, wherein one or more finger processors are assigned to each base station in a first set, and
   a searcher element operative to process one or more transmissions from one or more base stations in a second set, and
   wherein the finger processors and searcher element are each operative to perform a time measurement for a respective base station in the first or second set, and wherein time measurements for base stations in the first and second sets are performed between updates of a control signal for a reference clock used to perform the time measurements.

6. The remote terminal of claim 5, wherein time measurements for the one or more base stations in the second set are performed sequentially.

7. The remote terminal of claim 5, wherein base stations in the second set are not in active communication with the remote terminal.

8. The remote terminal of claim 5, wherein the time measurements for the base stations in the second set are based on pilot references transmitted by the base stations.

9. The remote terminal of claim 5, wherein the updates of the control signal occur at a period of approximately 200 msec.

10. The remote terminal of claim 5, wherein the time measurements are performed after a predetermined delay time period following an update of the control signal.

11. The remote terminal of claim 5, wherein the reference clock comprises a voltage controlled crystal oscillator.

12. The remote terminal of claim 5, wherein the time measurements correspond to SFN-SFN measurements for the base stations in the first and second sets in accordance with W-CDMA standard.

13. The remote terminal of claim 5, wherein the time measurement for each base station is based on an earliest arriving multipath received for the base station.

14. The remote terminal of claim 5, wherein the time measurements for the base stations in the first and second sets are based on pilot references transmitted by the base stations.

15. The remote terminal of claim 5, wherein the time measurements for the base stations in the first and second sets are based on transmissions on a particular channel.

16. A remote terminal in a communication system, comprising:
   means for receiving, processing, and digitizing a received signal to provide samples;
   means for receiving and processing the samples to provide time measurements indicative of times of arrival of transmissions received at the remote terminal from a plurality of base stations; and
   means for generating a clock signal used by the means for receiving and processing the samples,
   wherein the means for receiving and processing the samples includes a plurality of means for finger processing, wherein a first set of one or more means for finger processing is assigned to a first set of one or more base stations in active communication with the remote terminal, wherein a second set of one or more means for finger processing is assigned to a second set of one or more base stations not in active communication with the remote terminal, wherein means for finger processing assigned to base stations in the first and second sets are operative to perform the time measurements on the transmissions received from the base stations, and wherein the means for finger processing perform the time measurements within a time period between updates of the means for generating the clock signal.

17. The remote terminal of claim 16, wherein the time measurements are performed at approximately the same instance in time.

18. The remote terminal of claim 16, wherein the Lime measurement for each base station is based on an earliest arriving multipath received for the base station.

19. The remote terminal of claim 16, wherein the time measurements for the base stations are based on transmissions on a particular channel.

20. A remote terminal in a communication system, comprising:
   a first means for receiving operative to receive, process, and digitize a modulated signal to provide samples; and
   a second means for receiving coupled to the first means for receiving and operative to receive and process the samples to provide rime measurements indicative of times of arrival of transmissions received at the remote terminal from a plurality of base stations, wherein the second means for receiving includes:
      a plurality of means for finger processing, wherein one or more means for finger processing are assigned to each base station in a first set, and
      a means for searching operative to process one or more transmissions from one or more base stations in a second set, and
      wherein the means for finger processing and means for searching are each operative to perform a time measurement for a respective base station in the first or second set, and wherein time measurements for base stations in the first and second sets are performed between updates of a control signal for a reference clock used to perform the time measurements.

21. The remote terminal of claim 20, wherein time measurements for the one or more base stations in the second set are performed sequentially.

22. The remote terminal of claim 20, wherein base stations in the second set are not in active communication with the remote terminal.

23. The remote terminal of claim 20, wherein the time measurements for the base stations in the second set are based on pilot references transmitted by the base stations.

24. The remote terminal of claim 20, wherein the updates of the control signal occur at a period of approximately 200 msec.

25. The remote terminal of claim 20, wherein the time measurements are performed after a predetermined delay time period following an update of the control signal.

26. The remote terminal of claim 20, wherein the reference clock comprises a voltage controlled crystal oscillator.

27. The remote terminal of claim 20, wherein the time measurements correspond to SFN-SFN measurements for the base stations in the first and second sets in accordance with W-CDMA standard.

28. The remote terminal of claim 20, wherein the time measurement for each base station is based on an earliest arriving multipath received for the base station.

29. The remote terminal of claim 20, wherein the time measurements for the base stations in the first and second sets are based on pilot references transmitted by the base stations.

30. The remote terminal of claim 20, wherein the time measurements for the base stations in the first and second sets are based on transmissions on a particular channel.

31. A remote terminal in a communication system, comprising:
   means for identifying a first set of one or more base stations in active communication with the remote terminal;
   means for assigning at least one finger processor of a rake receiver to each base station in the first set;
   means for performing a time measurement for each base station in the first set;
   means for identifying a second set of one or inure base stations not in active communication with the remote terminal;
   means for performing a time measurement for each base station in the second set,
   wherein time measurements for base stations in the first and second sets are performed between updates of a control signal for a reference clock used to perform the time measurements, and
   wherein at least one of the means for performing the time measurement for each base station in the first set or means for performing the time measurement for each base station in the second set includes:
      means for processing a multipath for the base station to obtain samples, and
      means for processing the samples to determine a start of a radio frame for a particular transmission, and wherein the time measurement is indicative of the start of the radio frame.

* * * * *